(12) United States Patent
Mu

(10) Patent No.: US 12,342,424 B2
(45) Date of Patent: Jun. 24, 2025

(54) COMMUNICATION METHOD AND APPARATUS

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 366 days.

(21) Appl. No.: 17/761,919

(22) PCT Filed: Sep. 20, 2019

(86) PCT No.: PCT/CN2019/107093
§ 371 (c)(1),
(2) Date: Mar. 18, 2022

(87) PCT Pub. No.: WO2021/051408
PCT Pub. Date: Mar. 25, 2021

(65) Prior Publication Data
US 2022/0377530 A1    Nov. 24, 2022

(51) Int. Cl.
| | |
|---|---|
| H04W 4/00 | (2018.01) |
| H04W 8/20 | (2009.01) |
| H04W 8/24 | (2009.01) |
| H04W 28/02 | (2009.01) |
| H04W 28/24 | (2009.01) |
| H04W 48/16 | (2009.01) |
| H04W 72/51 | (2023.01) |

(52) U.S. Cl.
CPC .............. *H04W 8/205* (2013.01); *H04W 8/24* (2013.01); *H04W 28/0215* (2013.01); *H04W 28/24* (2013.01); *H04W 48/16* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 10,681,648 B2 * | 6/2020 | Jeon | H04W 52/281 |
| 12,225,430 B2 * | 2/2025 | Vassilovski | H04W 72/04 |

(Continued)

FOREIGN PATENT DOCUMENTS

| | | |
|---|---|---|
| CN | 103517259 A | 1/2014 |
| CN | 108135031 A | 6/2018 |

OTHER PUBLICATIONS

European Patent Application No. 19945664.1, extended Search and Opinion dated Apr. 14, 2023, 14 pages.

(Continued)

*Primary Examiner* — Bob A Phunkulh
(74) *Attorney, Agent, or Firm* — Cozen O'Connor

(57) ABSTRACT

A communication method and apparatus. The communication method includes reporting a capability parameter set, in which the capability parameter set represents information on a capability supported by the terminal; and receiving first schedule information sent by a network device, in which the first schedule information includes second schedule information corresponding to a capability parameter subset, and the capability parameter subset includes a capability parameter matching a business requirement of the terminal in the capability parameter set.

13 Claims, 6 Drawing Sheets

(56) References Cited

U.S. PATENT DOCUMENTS

| | | | |
|---|---|---|---|
| 2010/0220687 A1* | 9/2010 | Reznik | H04W 36/005 |
| | | | 370/329 |
| 2017/0346605 A1* | 11/2017 | Chendamarai Kannan | |
| | | | H04L 1/1874 |
| 2018/0206208 A1 | 7/2018 | Nguyen et al. | |
| 2018/0219652 A1* | 8/2018 | Chen | H04W 88/023 |
| 2018/0288794 A1* | 10/2018 | Wang | H04W 4/70 |
| 2019/0387481 A1* | 12/2019 | Yang | H04W 52/18 |
| 2020/0045685 A1* | 2/2020 | Rico Alvarino | H04L 5/0048 |
| 2020/0092938 A1* | 3/2020 | Tang | H04W 56/005 |
| 2020/0236699 A1* | 7/2020 | Nakashima | H04L 5/0053 |
| 2020/0245180 A1* | 7/2020 | Matsukawa | H04W 28/0215 |
| 2021/0045042 A1* | 2/2021 | Nakashima | H04L 5/0094 |
| 2021/0136770 A1* | 5/2021 | Nakashima | H04W 72/53 |
| 2021/0351865 A1* | 11/2021 | Ouchi | H04W 8/24 |
| 2021/0360390 A1* | 11/2021 | Chun | H04W 48/06 |
| 2024/0098719 A1* | 3/2024 | Sienkiewicz | H04W 72/12 |

OTHER PUBLICATIONS

PCT/CN2019/107093 English translation of International Search Report dated Jun. 24, 2020, 2 pages.

\* cited by examiner

COMMUNICATION METHOD AND APPARATUS

CROSS-REFERENCE TO RELATED APPLICATION

This application is a U.S. National Stage of International Application No. PCT/CN2019/107093, filed on Sep. 20, 2019, the contents of all of which are incorporated herein by reference in their entireties for all purposes.

TECHNICAL FIELD

The disclosure relates to a field of communication technologies, and particularly to a communication method and apparatus.

BACKGROUND

With development of the communication technologies, a new radio-light (NR-light) terminal is widely used.

The NR-light terminal has a wide application scenario, for example video monitoring, intelligent home, wearable devices, and industrial sensor monitoring. Different application scenarios have different requirements on a capability of the terminal. Unlike a legacy mobile terminal, the NR-light terminal is diversified, and different NR-light terminals have different service requirements on the mobile communication system.

SUMMARY

According to an aspect of the embodiments of the disclosure, a communication method is provided. The method is performed by a terminal and includes: reporting a capability parameter set, in which the capability parameter set represents information on a capability supported by the terminal; and receiving first schedule information sent by a network device, in which the first schedule information includes second schedule information corresponding to a capability parameter subset, and the capability parameter subset includes a capability parameter matching a business requirement of the terminal in the capability parameter set.

According to another aspect of the embodiments of the disclosure, a communication method is provided. The method is performed by a network device and includes: obtaining a capability parameter set, in which the capability parameter set represents information on a capability supported by the terminal; and determining and sending first schedule information, in which the first schedule information includes second schedule information corresponding to a capability parameter subset, and the capability parameter subset includes a capability parameter matching a business requirement of the terminal in the capability parameter set.

According to another aspect of the embodiments of the disclosure, a communication device is provided. The device includes: a processor and a memory storing instructions executable by the processor. The processor is configured to perform the communication method according to the above aspect or any implementation of the above aspect of the disclosure.

According to another aspect of the embodiments of the disclosure, a communication device is provided. The device includes: a processor and a memory storing instructions executable by the processor. The processor is configured to perform the communication method according to the above aspect or any implementation of the above aspect of the disclosure.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the specification.

DETAILED DESCRIPTION

Certain embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

Figure 1:
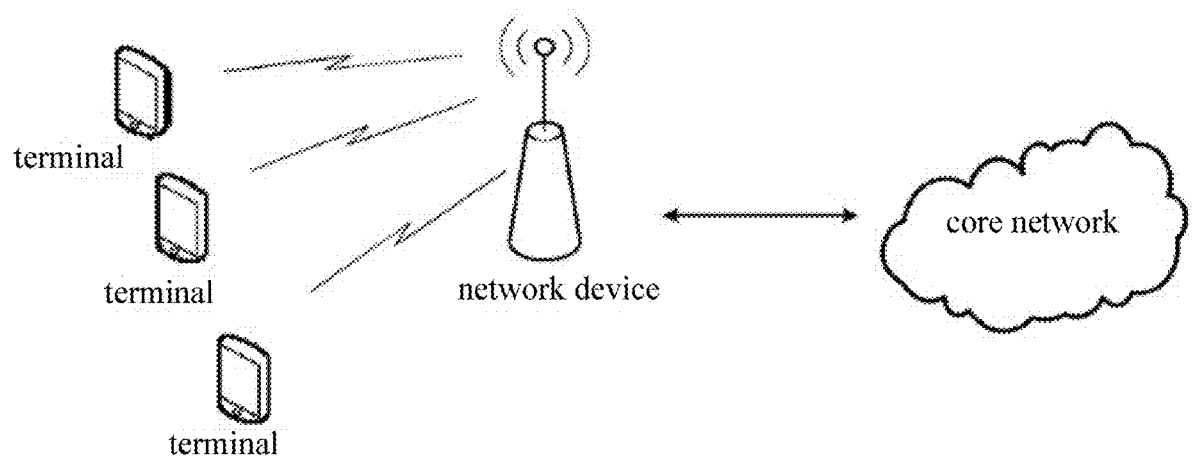
FIG. 1 is a schematic diagram illustrating a wireless communication system according to an embodiment.

The disclosure provides a communication method and apparatus. The method may be applied in a wireless communication system illustrated in FIG. 1. As illustrated in FIG. 1, a terminal is accessed to a network through a network device such as a base station. The network device and a core network complete forward and reverse transmissions of data, to provide various communication services.

It is understandable that the wireless communication system is a network that provides a wireless communication function. The wireless communication system can use different communication technologies, such as code division multiple access (CDMA), wideband code division multiple access (WCDMA), and time division multiple access (TDMA), frequency division multiple access (FDMA), orthogonal frequency-division multiple access (OFDMA), single carrier frequency division multiple access (SC-FDMA), carrier sense multiple access with collision avoidance. According to different network capacities, speeds, delays and other factors, the network can be divided into the 2G (generation) network, the 3G network, the 4G network or a future evolution network, such as the 5G network. The 5G network can also be called a new wireless network (New Radio, NR). For convenience of description, the disclosure sometimes refers to the wireless communication network as a network or a system. The network in the disclosure may include a radio access network (RAN) and a core network (CN). The network includes a network device, and the network device may be, for example, a wireless access network node, a core network device, and the like. The wireless access network node may also be called a base station. The network can provide network services for the terminal through the network device, and different operators can provide different network services for the terminal. It can also be understood that different operators correspond to different operator networks.

The terminal, which can also be referred to as user equipment (UE), mobile station (MS), mobile terminal (MT), etc., is a device that provides users with voice and/or data connectivity. For example, the terminal may be a handheld device with a wireless connection function, a vehicle-mounted device, or the like. At present, some examples of the terminal may be: smart phones (mobile phones), pocket personal computers (PPCs), handheld computers, personal digital assistants (PDAs), notebook computers, tablet computers, wearable devices, or vehicle-mounted devices, etc.

In order to support Internet of Things (IOT), the IOT technology such as narrow brand IOT (NB-IOT) and machine type communications (MTC). At present, an IOT device in the IOT technology such as the NB-IOT and MTC is mainly used in a low rate and high delay scenario. The IOT device under the low rate and high delay scenario generally meet requirements such as a low cost, a low complexity, a certain extent of coverage enhancement and power enhancement and so on, for example, under the meter reading, environment monitoring scenarios and the like. The NB-IOT currently at most supports several hundreds of Kilos of speed rate, while the MTC currently at most supports several Millions of speed rate. With continuous development and popularization of the IOT business, for example the businesses such as video monitoring, intelligent home, wearable devices, and industrial sensor monitoring and so on generally requires dozens of Millions of speed rate to 100M of speed rate, and also has a relative high requirement on the time delay. Based on this situation, a new IOT technology is designed in the 5G NR to satisfy the requirements of such terminal IOT devices. In the 3GPP ($3^{rd}$ generation partnership project), such terminal may be referred to as a new radio-light (NR-light) terminal. The terminal in the following embodiment of the present disclosure may be understood as the NR-light terminal. For ease of description, in some times, the NR-light terminal in the following embodiment can be called the terminal, those skilled in the art may understand its meaning.

The NR-light terminal has a wide application scenario, for example video monitoring, intelligent home, wearable devices, and industrial sensor monitoring. Different application scenarios have different requirements on a capability of the terminal. For example, in the aspect of video monitoring, the terminal needs to have a relative high uplink rate, while the wearable device requires a low size of high mobility on the terminal components. For the industrial sensor monitoring scenario, the terminal needs to have a short transmission delay and the like.

In order to enable the NR-light terminal to apply in more application scenarios, one idea is to enable the terminal to support a high rate, a low delay, and a high mobility and so on. Although such design may meet the business requirements in various application scenarios, on the other hand, the design idea may cause an increased deign complexity and an increased cost of the terminal.

In view of this, the embodiment of the disclosure provides a communication method. In the communication method provided in the embodiment of the disclosure, the terminal determines and reports information on a capability supported by the terminal. The information on the capability includes a capability parameter set including one or more capability parameters. The network device determines a capability parameter subset meeting a business requirement of the terminal based on the capability parameter set supported by the terminal, and determines schedule information of the terminal for the capability parameter subset. The terminal performs communication based on the schedule information meeting the business requirement. According to the disclosure, a cost and a complexity of the terminal may be reduced, and business requirements under various application scenarios may be met.

Figure 2:
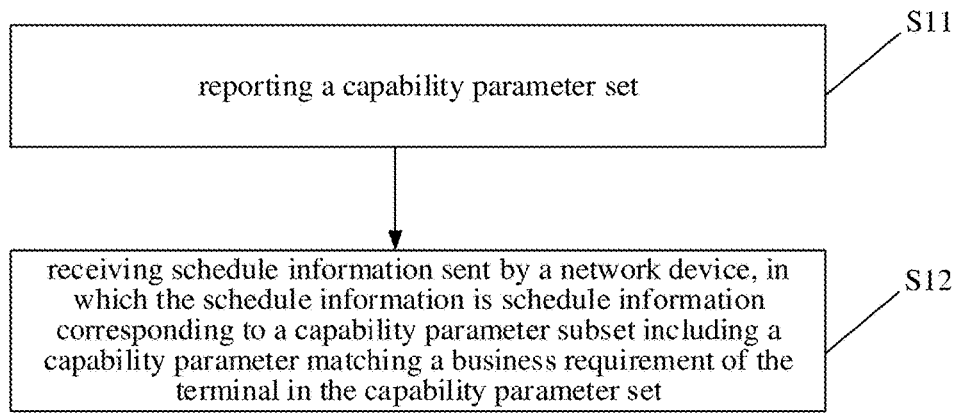
FIG. 2 is a flowchart illustrating a communication method according to an embodiment.

FIG. 2 is a flowchart illustrating a communication method according to an embodiment. As illustrated in FIG. 2, the communication method is applied in a terminal, and includes steps at block S11 and S12.

At block S11, a capability parameter set is reported.

In the disclosure, when the terminal accesses a network device, the terminal reports information on a capability supported by the terminal. The information on the capability may be the capability parameter set. The capability parameter set represents the information on the capability supported by the terminal.

In the disclosure, the capability parameter set supported by the terminal represents the information on the capability supported by the terminal. The capability parameter set supported by the terminal includes one or more capability parameters of the terminal.

In the disclosure, on one hand, the capability parameter set supported by the terminal includes a capability of the terminal for meeting a lowest communication requirement, for example the capability parameter set includes a bandwidth capability and an antenna capability supported by the terminal; on the other hand, the capability parameter set supported by the terminal includes a capability of the terminal further to be met based on an actual application scenario. For example the capability parameter set further includes one or a combination of the following: a capability related to a maximum transmitting power level, a duplex mode supporting capability, a capability related to a maximum number of physical downlink control channel (PDCCH) blind detections, a capability related to a minimum processing delay, a carrier aggregation supporting capability, a dual connection supporting capability, a discontinuous reception capability, a mini-slot scheduling capability, a coverage enhancement supporting capability, a measurement conditional relaxation supporting capability, a full mobility supporting capability and a speech supporting capability.

At block S12, schedule information sent by a network device is received.

In the disclosure, the schedule information received by the terminal may be schedule information corresponding to a capability parameter subset including a capability parameter matching a business requirement of the terminal in the capability parameter set. The schedule information may be parameter configuration information, may also be function enabling information. By performing parameter configuration or function enabling on the capability parameter matching the business requirement through the parameter configuration information and the function enabling information, the capability of the terminal may match the business requirement.

The business requirement of the terminal may be determined based on an actual application scenario. On one hand, the business requirement of the schedule information may be determined by the network device. For example, for a scenario having a high requirement on the downlink rate and sensitive to the downlink business delay, the network device may determine the business requirement. On the other hand, the business requirement of the schedule information may be determined by the terminal.

When the business requirement is determined by the terminal, the communication method described above may further include a process that the terminal reports the business requirement.

Figure 3:
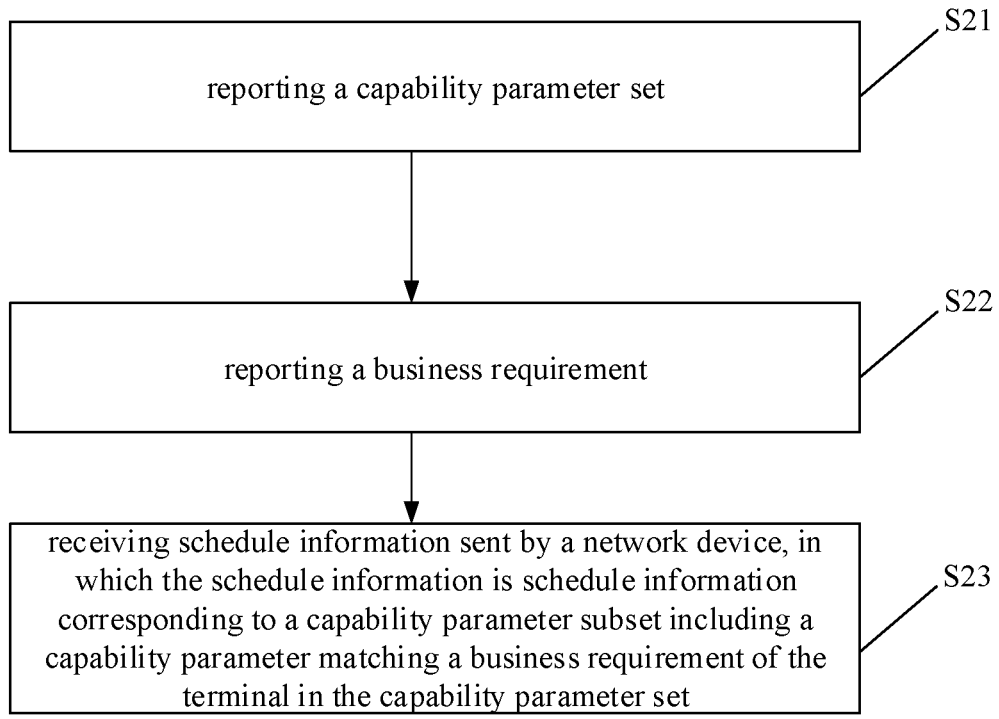
FIG. 3 is a flowchart illustrating a communication method according to an embodiment.

FIG. 3 is a flowchart illustrating a communication method according to an embodiment. As illustrated in FIG. 3, the communication method is applied in a terminal, and includes steps at block S21 to S23.

At block S21, a capability parameter set is reported.

At block S22, a business requirement is reported.

In the disclosure, the terminal may determine the business requirement based on an actual application scenario when performing communication. For example, the business requirement includes one or a combination of the following: a full mobility requirement, a power saving requirement, a coverage enhancement requirement, a speech supporting requirement, and a high rate requirement.

It is understandable that, an execution order of the steps at block S21 and S22 in the disclosure is not limited. For example, the business requirement may be reported firstly, and then the capability parameter set is reported. For another example, the capability parameter set may be reported firstly, and then the business requirement is reported. For another example, the capability parameter set and the business requirement may be reported simultaneously.

At block S23, schedule information sent by a network device is received.

In the disclosure, the terminal determines and reports information on a capability supported by the terminal. The information on the capability may include the capability parameter set including one or more capability parameters. The terminal receives the schedule information of a capability requirement subset matching the business requirement. The terminal performs communication based on the schedule information matching the business requirement, such that a cost and a complexity of the terminal may be reduced, and business requirements under various application scenarios may be met.

Figure 4:
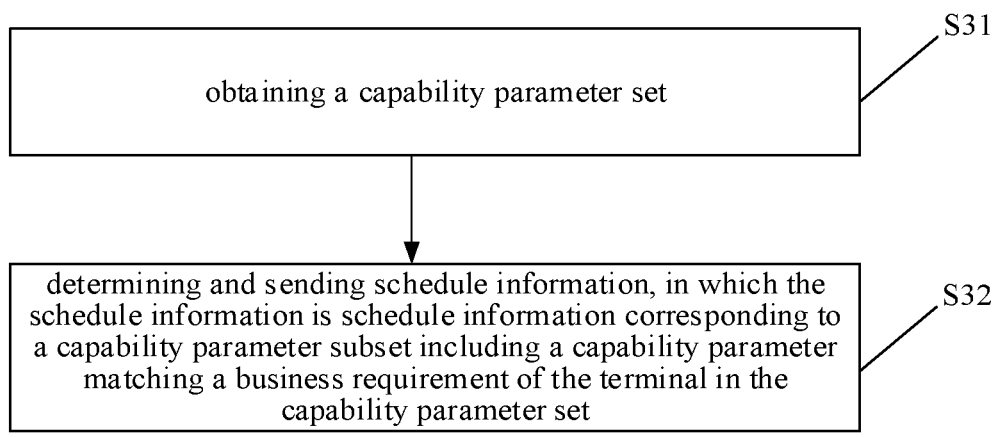
FIG. 4 is a flowchart illustrating a communication method according to an embodiment.

FIG. 4 is a flowchart illustrating a communication method according to an embodiment. As illustrated in FIG. 4, the communication method is applied in a network device, and includes steps at block S31 and S32.

At block S31, a capability parameter set is obtained.

In the disclosure, the network device may obtain the capability parameter set reported by the terminal. The capability parameter set represents information on a capability supported by the terminal. On one hand, the capability parameter set includes a bandwidth capability and an antenna capability supported by the terminal; on the other hand, the capability parameter set further includes one or a combination of the following: a capability related to a maximum transmitting power level, a duplex mode supporting capability, a capability related to a maximum number of physical downlink control channel (PDCCH) blind detections, a capability related to a minimum processing delay, a carrier aggregation supporting capability, a dual connection supporting capability, a discontinuous reception capability, a mini-slot scheduling capability, a coverage enhancement supporting capability, a measurement conditional relaxation supporting capability, a full mobility supporting capability and a speech supporting capability.

At block S32, schedule information is determined and sent.

In the disclosure, the network device obtains the capability parameter set of the terminal, and may determine one or more capability requirements matching a business requirement based on the capability parameter set and the business requirement. The one or more capability requirements matching the business requirement form a capability parameter subset. The network device matches the schedule information of the business requirement for the determined capability parameter subset.

The business requirement includes one or a combination of the following: a full mobility requirement, a power saving requirement, a coverage enhancement requirement, a speech supporting requirement, and a high rate requirement.

In the disclosure, the schedule information matching the business requirement includes parameter configuration information, and may also include function enabling information.

Further, in the disclosure, the business requirement based on which the network device determines the schedule information may be determined by the network device, or may also be determined by the terminal and reported to the network device. The network device receives the business requirement reported by the terminal.

Figure 5:
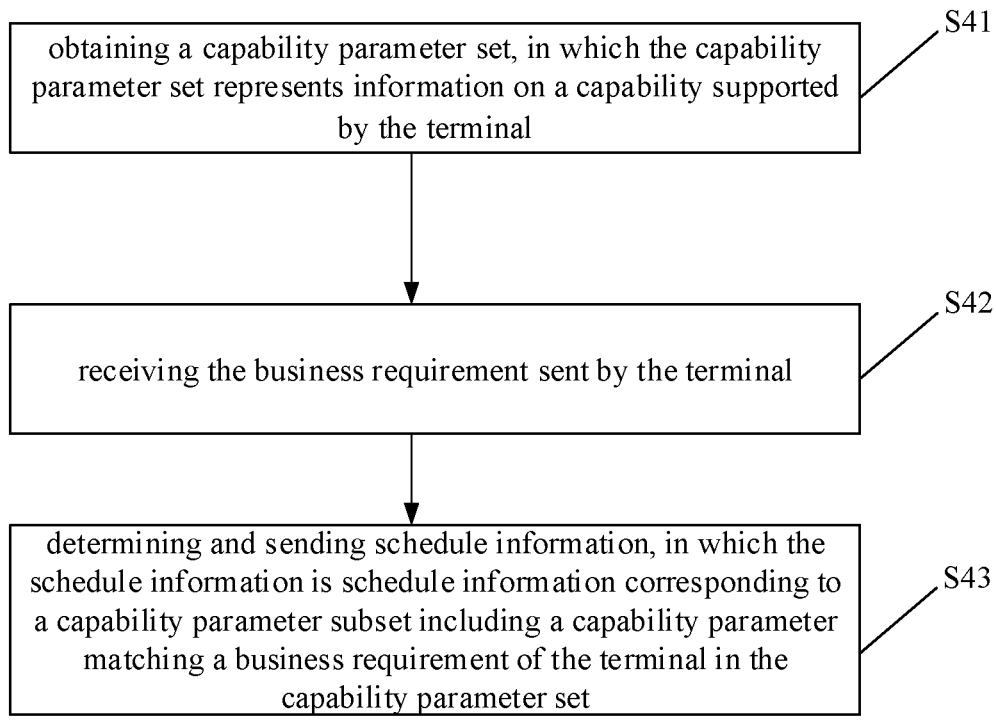
FIG. 5 is a flowchart illustrating a communication method according to an embodiment.

FIG. 5 is a flowchart illustrating a communication method according to an embodiment. As illustrated in FIG. 5, the communication method is applied in a network device, and includes steps at block S41 to S43.

At block S41, a capability parameter set is obtained. The capability parameter set represents information on a capability supported by the terminal.

At block S42, a business requirement sent by the terminal is received.

At block S43, schedule information is determined and sent.

In the disclosure, the network device determines the schedule information of the terminal based on the information on the capability and the business requirement reported by the terminal, such that the schedule information of the terminal may match the business requirement, and further scheduling of the terminal under an application scenario required by the terminal can be realized.

Figure 6:
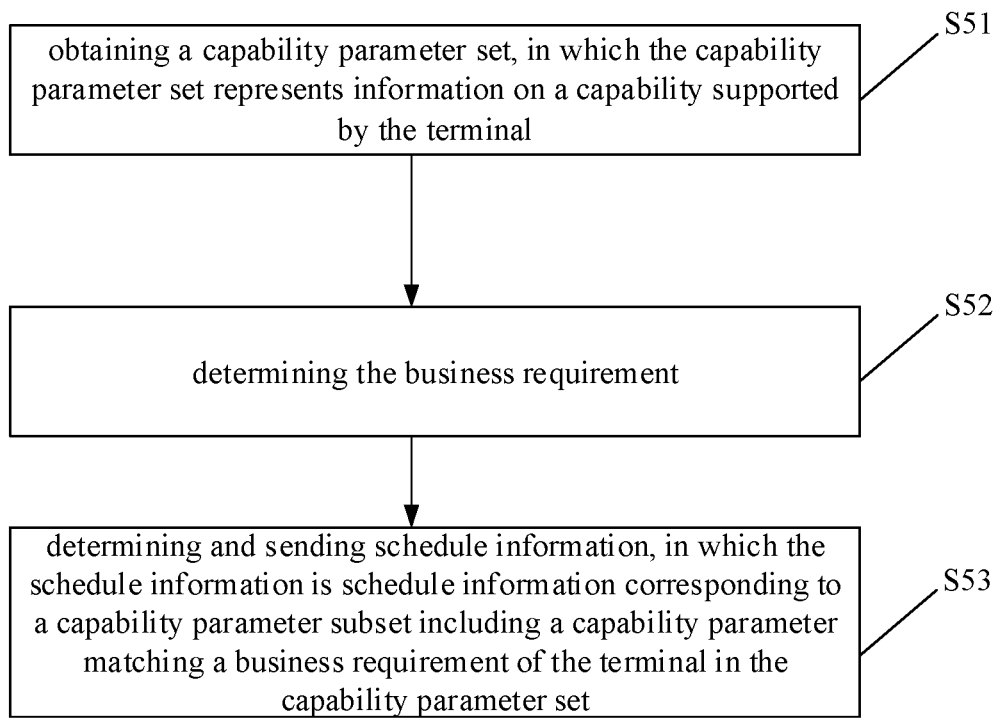
FIG. 6 is a flowchart illustrating a communication method according to an embodiment.

FIG. 6 is a flowchart illustrating a communication method according to an embodiment. As illustrated in FIG. 6, the communication method is applied in a network device, and includes steps at block S51 to S53.

At block S51, a capability parameter set is obtained. The capability parameter set represents information on a capability supported by the terminal.

At block S52, a business requirement is determined.

At block S53, schedule information is determined and sent.

In the disclosure, the network device determines the schedule information of the terminal based on the information on the capability reported by the terminal and the business requirement determined by the network device, such that the schedule information of the terminal may match the business requirement, and further scheduling of the terminal under an application scenario required by the network device can be realized.

Figure 7:
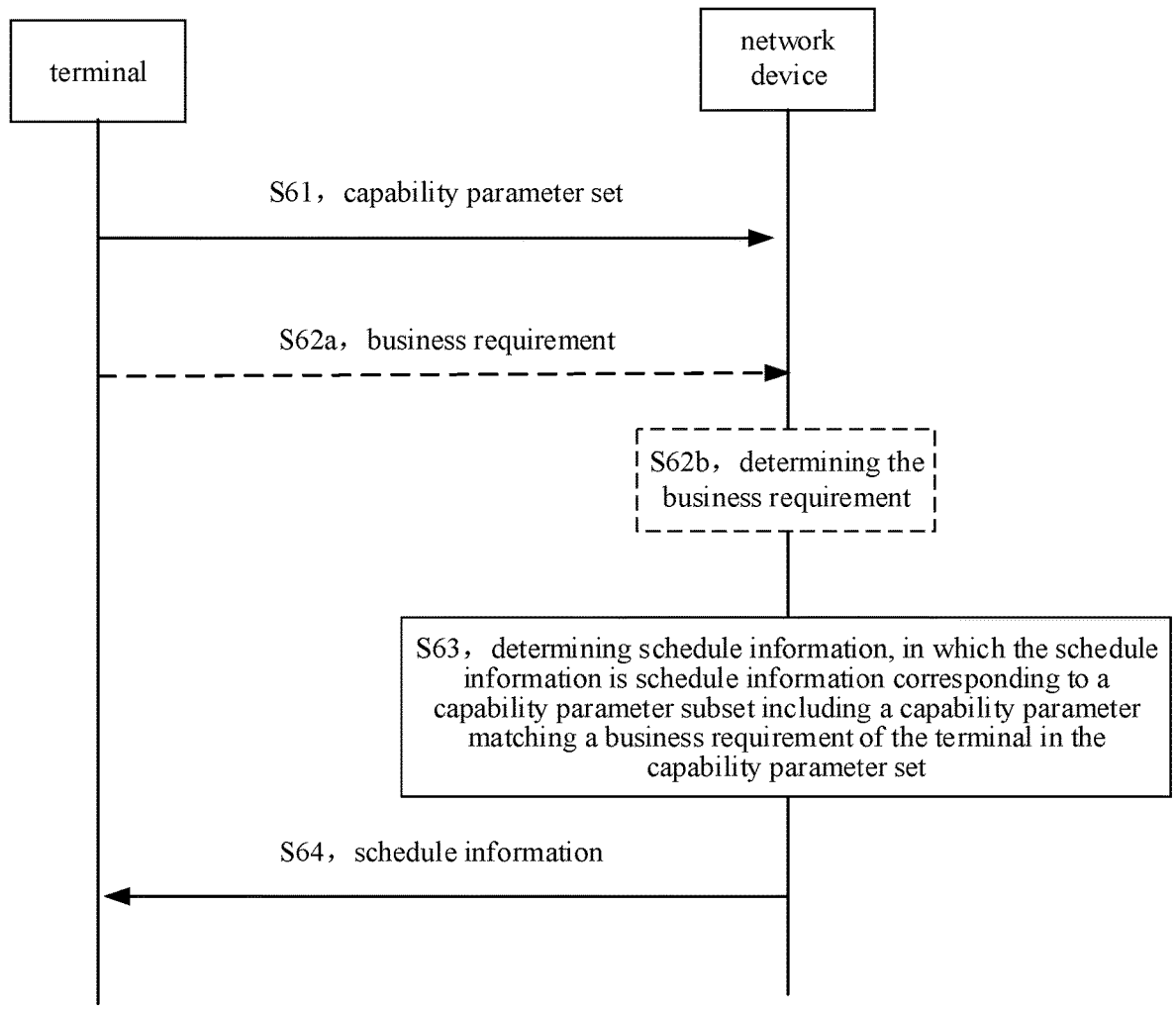
FIG. 7 is a flowchart illustrating a communication method according to an embodiment.

FIG. 7 is a flowchart illustrating a communication method according to an embodiment. As illustrated in FIG. 7, the communication method is applied in an interaction between a network device and a terminal, and includes steps at block S61 to S64.

At block S61, the terminal reports a capability parameter set, and the network device receives the capability parameter set reported by the terminal.

At block S62a, the terminal reports a business requirement.

The step at block S62a may be an alternative step.

At block S62b, the network device determines a business requirement.

The step at block S62b may be an alternative step.

It is understandable that the steps at blocks S62a and S62b may be performed alternatively.

At block S63, the network device determines schedule information.

At block S64, the network device sends the schedule information, and the terminal receives the schedule information sent by the network device.

In the communication method provided in the disclosure, the terminal determines and reports information on a capability supported by the terminal. The information on the capability includes the capability parameter set including one or more capability parameters. The network device determines a capability parameter subset matching the business requirement of the terminal based on the capability parameter set reported by the terminal, and determines the schedule information of the terminal for the capability parameter subset. The terminal performs communication based on the schedule information matching the business requirement. According to the disclosure, a cost and a complexity of the terminal may be reduced, and business requirements under various application scenarios may be met.

The communication method in the above embodiments may be described below in combination with actual applications in the embodiments of the disclosure.

In the disclosure, the terminal needs to determine information on a capability supported by the terminal in advance to implement the above communication method. The information on the capability supported by the terminal may be determined in a predetermined way.

In an implementation, the terminal needs to configure a basic capability of the NR-light terminal. The basic capability of the NR-light terminal may include a bandwidth capability and an antenna capability supported by the terminal. For example, the basic capability of the NR-light terminal configured by the terminal in advance indicating supporting the bandwidth of 5 MHz or 10 MHz, and one receiving antenna.

In another implementation, the terminal further configures other capabilities according to application scenarios.

In an example, the terminal may configure a capability related to a maximum transmitting power level. For example, the terminal configures the maximum transmitting power level to be 23 dBm, 14 dBm and 11 dBm. The terminal may further select the capability related to the maximum transmitting power level to be configured based on the application scenario. For example, for a wearable device, a size of the component is small, so that the required maximum transmitting power is limited. For such terminal, the selected capability may be the limited maximum transmitting power, such as 14 dBm and 11 dBm.

In an example, the terminal configures a duplex mode supporting capability. The duplex mode supporting capability includes two modes, i.e., half duplex frequency division duplex (HD-FDD) and full-duplex frequency division duplex (FD-FDD). The terminal may further select the duplex mode to be configured based on the application scenario. For example, the user device having a low requirement on the cost and the transmission rate may be configured with HD-FDD.

In an example, the terminal configures a capability related to a maximum number of physical downlink control channel (PDCCH) blind detections. For example, the maximum number of PDCCH blind detections may be equal or less than 44. The terminal may further select the maximum number of PDCCH blind detections to be configured based on the application scenario. For example, the terminal having a low cost, limited processing capability and a power saving requirement may be configured with the maximum number of PDCCH blind detections less than 44.

In an example, the terminal configures a capability related to a minimum processing delay. For example, the capability related to the minimum processing delay configured by the terminal may be X1, X2. The terminal may further select the capability related to the minimum processing delay to be configured based on the application scenario. For example, for the scenario with a low delay requirement, such as industrial sensor monitoring, a low processing or transmission delay is required, the terminal may be configured with the capability with a low processing delay.

In an example, the terminal configures a carrier aggregation supporting capability or a dual connection supporting capability. The carrier aggregation supporting capability represents whether to support the carrier aggregation. The dual connection supporting capability represents whether to support the dual connection. The terminal may further select the carrier aggregation supporting capability or the dual connection supporting capability to be configured based on the application scenario. For example, for the scenario having a high rate requirement, such as video monitoring, the carrier aggregation or the dual connection may be supported. Further, for the scenario similar to the video monitoring which has a high uplink requirement, merely the carrier aggregation or the dual connection may be supported.

In an example, the terminal configures a discontinuous reception (DRX) capability. For example, the DRX capability configured by the terminal may include a long DRX and a short DRX. The terminal may further select the DRX capability to be configured based on the application scenario. For example, for the device having a high requirement on power saving, the device may support the long DRX.

In an example, the terminal configures a mini-slot scheduling capability. The mini-slot scheduling capability represents whether to support mini-slot scheduling. The terminal may further select the mini-slot scheduling capability to be configured based on the application scenario. For example, for the scenario having a low delay requirement, such as industrial sensor monitoring, a low processing or transmission delay is required, the terminal may be configured with the capability with a low processing delay.

In an example, the terminal configures a coverage enhancement supporting capability. The coverage enhancement supporting capability represents whether to support coverage enhancement. The terminal may further select the coverage enhancement supporting capability to be configured based on the application scenario. For example, for the indoor user device, such as the terminal in the smart home, the terminal may support a coverage enhancement function.

In an example, the terminal configures a measurement conditional relaxation supporting capability. The measurement conditional relaxation supporting capability represents whether to support measurement conditional relaxation. The terminal may further select the measurement conditional relaxation supporting capability to be configured based on the application scenario. For example, for the user device having a low mobility, such as video monitoring, the measurement condition may be relaxed.

In an example, the terminal configures a full mobility supporting capability. The full mobility supporting capability represents whether to support full mobility. The terminal may further select the full mobility supporting capability to be configured based on the application scenario. For example, for the user device having a wide mobility range, such as a wearable terminal, the full mobility may be supported.

In an example, the terminal configures a speech supporting capability. The speech supporting capability represents whether to support speech communication. The terminal may further select the speech supporting capability to be configured based on the application scenario. For example, for the terminal having a speech requirement, such as a low-end smart phone, a wearable terminal, the speech communication may be supported.

In the disclosure, when the terminal accesses the network, the terminal needs to report the capability supported by the terminal (the above preconfigured information on the capability). The information on the capability reported by the terminal may be one or more kinds of information. In the disclosure, the information on the capability reported by the terminal can be called the capability parameter set. The network device receives the capability parameter set reported by the terminal, and performs scheduling of the terminal (determining the schedule information) based on the capability supported by the terminal.

In an example, the capability parameter set includes a capability related to a maximum number of physical downlink control channel (PDCCH) blind detections. The schedule information determined by the network device indicates configuring the number of PDCCH blind detections for the terminal to be less than or equal to the maximum number of PDCCH blind detections represented by the capability related to the maximum number of PDCCH blind detections.

In an example, the capability parameter set includes a capability related to a maximum transmitting power level. The schedule information determined by the network device includes a modulation and coding scheme (MCS) configuring a maximum transmitting power level represented by the capability related to the maximum transmitting power level. For example, for the terminal with a low transmitting power level, a small MCS is configured.

In an example, the capability parameter set includes a duplex mode supporting capability, and the duplex mode supporting capability represents that the HD-FDD capability is supported. The schedule information determined by the network device indicates that the network device stops to send data and the terminal stops to receive data. In other words, in case that the duplex mode supporting capability represents that the HD-FDD capability is supported, the network device does not send data any more when the terminal sends data, while the network device does not need to send data when the terminal receives data.

Further, in the disclosure, when the network device determines the schedule information of the terminal, the network device needs to determine one or more capability parameters (the capability parameter subset) matching a business requirement of a current application scenario based on the business requirement of the current application scenario, and determines the schedule information matching the capability parameter subset.

In an example, the business requirement includes a full mobility requirement. The capability parameter subset includes a full mobility supporting capability. The schedule information includes function enabling information for enabling reselection and switching of cells, and includes parameter configuration information for configuring that the same measurement parameter as the enhanced mobility bandwidth is used.

In an example, the business requirement includes a low mobility requirement. The capability parameter subset includes a measurement conditional relaxation supporting capability. The schedule information includes parameter configuration information for configuring a first specified duration of measurement cycle. The first specified duration of measurement cycle is used to relax the measurement condition.

In an example, the business requirement includes a power saving requirement. The capability parameter subset includes a discontinuous reception capability. The schedule information includes parameter configuration information for configuring a second specified duration of DRX interval.

In an example, the business requirement includes a coverage enhancement requirement. The capability parameter subset includes configuring one or a combination of retransmission and frequency hopping transmission. The schedule information includes function enabling information for enabling a retransmission function.

In an example, the business requirement includes a high rate requirement. The capability parameter subset includes one or a combination of a carrier aggregation supporting capability and a dual connection supporting capability. The schedule information includes function enabling information for enabling a carrier aggregation function and a dual connection transmission function.

In the communication method provided in the embodiment of the disclosure, the terminal determines and reports information on a capability supported by the terminal. The information on the capability includes a capability parameter set including one or more capability parameters. The network device determines a capability parameter subset meeting a business requirement of the terminal based on the capability parameter set supported by the terminal, and determines schedule information of the terminal for the capability parameter subset. The terminal performs communication based on the schedule information meeting the business requirement. According to the disclosure, a cost and a complexity of the terminal may be reduced, and business requirements under various application scenarios may be met.

Based on the same conception, the embodiment of the disclosure further provides a communication apparatus.

It is understood that, the communication apparatus provided in the embodiment of the disclosure includes corresponding hardware and/or software modules for performing various functions to implement the above functionality. In combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 8:
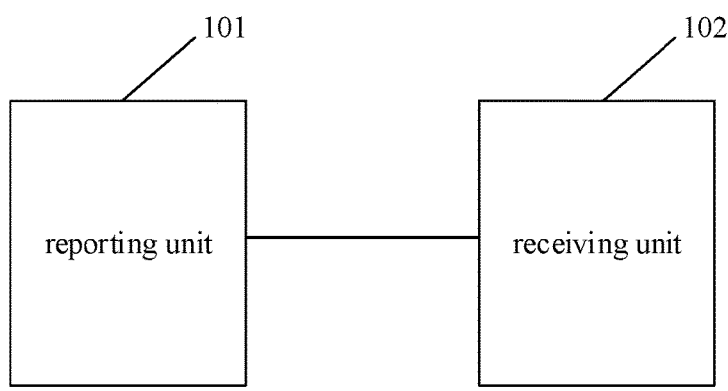
FIG. 8 is a block diagram illustrating a communication apparatus according to an embodiment.

FIG. 8 is a block diagram illustrating a communication apparatus according to an embodiment. As illustrated in FIG. 8, the communication apparatus 100 is applied in a terminal, and the communication apparatus 100 includes a reporting unit 101 and a receiving unit 102.

The reporting unit 101 is configured to report a capability parameter set, in which the capability parameter set represents information on a capability supported by the terminal. The receiving unit 102 is configured to receive first schedule information sent by a network device, in which the first schedule information includes second schedule information corresponding to a capability parameter subset, and the capability parameter subset includes a capability parameter matching a business requirement of the terminal in the capability parameter set.

In an implementation, the reporting unit 101 is further configured to report the business requirement.

In another implementation, the business requirement is determined by the network device.

In another implementation, the capability parameter set includes a bandwidth capability and an antenna capability supported by the terminal.

In another implementation, the capability parameter set includes one or a combination of the following: a capability related to a maximum transmitting power level, a duplex mode supporting capability, a capability related to a maximum number of physical downlink control channel (PDCCH) blind detections, a capability related to a minimum processing delay, a carrier aggregation supporting capability, a dual connection supporting capability, a discontinuous reception capability, a mini-slot scheduling capability, a coverage enhancement supporting capability, a measurement conditional relaxation supporting capability, a full mobility supporting capability and a speech supporting capability.

In another implementation, the business requirement includes one or a combination of the following: a full mobility requirement, a power saving requirement, a coverage enhancement requirement, a speech supporting requirement, and a high rate requirement.

In another implementation, the first schedule information includes one or a combination of parameter configuration information and function enabling information.

Figure 9:
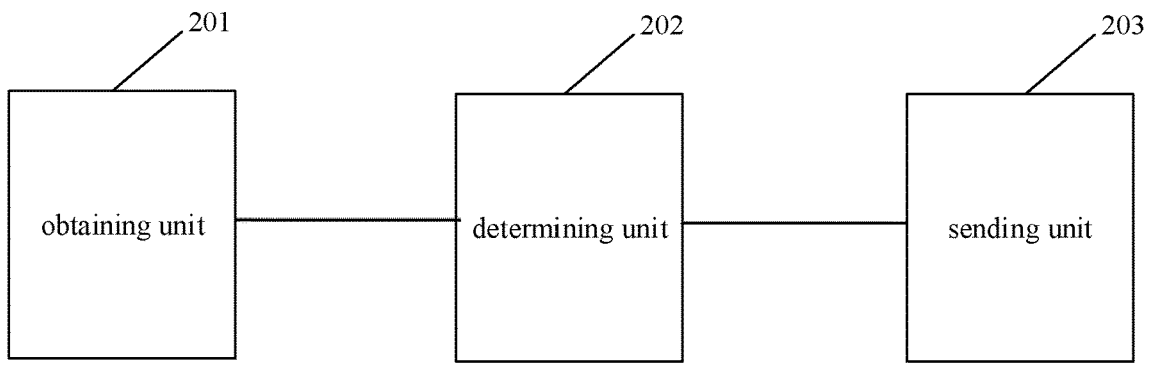
FIG. 9 is a block diagram illustrating a communication apparatus according to an embodiment.

FIG. 9 is a block diagram illustrating a communication apparatus according to an embodiment. As illustrated in FIG. 9, the communication apparatus 200 is applied in a network device, and the communication apparatus 200 includes an obtaining unit 201, a determining unit 202 and a sending unit 203.

The obtaining unit 201 is configured to obtain a capability parameter set, in which the capability parameter set represents information on a capability supported by the terminal. The determining unit 202 is configured to determine first schedule information, in which the first schedule information includes second schedule information corresponding to a capability parameter subset, and the capability parameter subset includes a capability parameter matching a business requirement of the terminal in the capability parameter set. The sending unit 203 is configured to send the first schedule information.

In an implementation, the obtaining unit 201 is further configured to receive the business requirement sent by the terminal.

In another implementation, the determining unit 202 is further configured to determine the business requirement of the terminal.

In another implementation, the capability parameter set includes a bandwidth capability and an antenna capability supported by the terminal.

In another implementation, the capability parameter set includes one or a combination of the following: a capability related to a maximum transmitting power level, a duplex mode supporting capability, a capability related to a maximum number of physical downlink control channel (PDCCH) blind detections, a capability related to a minimum processing delay, a carrier aggregation supporting capability, a dual connection supporting capability, a discontinuous reception capability, a mini-slot scheduling capability, a coverage enhancement supporting capability, a measurement conditional relaxation supporting capability, a full mobility supporting capability and a speech supporting capability.

In another implementation, the business requirement includes one or a combination of the following: a full mobility requirement, a power saving requirement, a coverage enhancement requirement, a speech supporting requirement, and a high rate requirement.

In another implementation, the first schedule information includes one or a combination of parameter configuration information and function enabling information.

Regarding the apparatus in the above-mentioned embodiments, the specific manner in which each module performs operations has been described in detail in the method embodiments, and will not be described in detail here.

Figure 10:
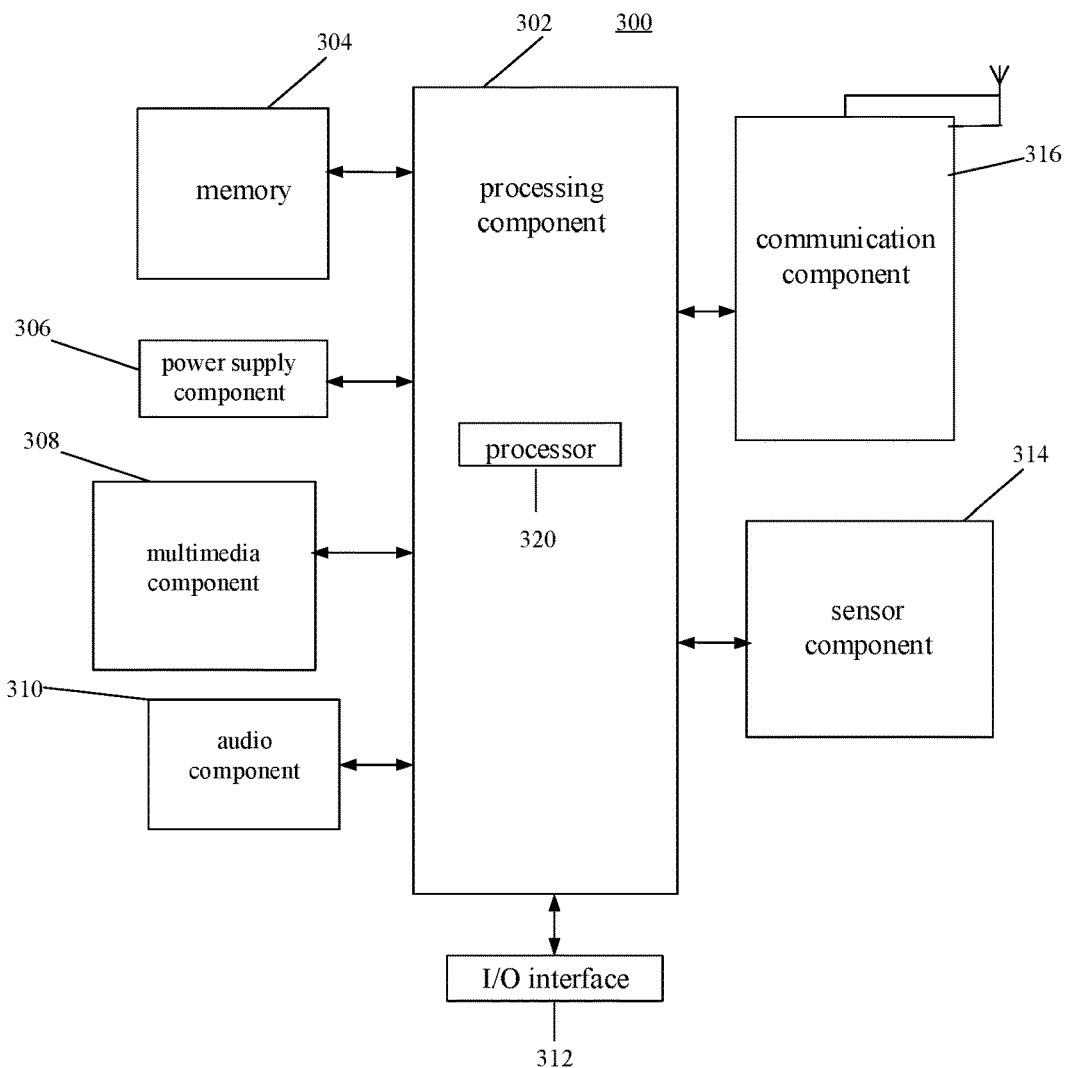
FIG. 10 is a block diagram illustrating a device according to an embodiment.

FIG. 10 is a block diagram illustrating an apparatus 300 configured to perform communication according to an embodiment. For example, the apparatus 300 may be a mobile phone, a computer, a digital broadcasting terminal, a messaging device, a game console, a tablet device, a medical equipment, a fitness equipment, a personal digital assistant, and so on.

Referring to FIG. 10, the apparatus 300 may include one or more components of the following: a processing component 302, a memory 304, a power supply component 306, a multimedia component 308, an audio component 310, an input/output (I/O) interface 312, a sensor component 314, and a communication component 316.

The processing component 302 generally controls the whole operation of the apparatus 300, such as the operations related to display, phone call, data communication, camera operation and recording operation. The processing component 302 may include one or more processors 320 to perform instructions, to complete all or part of blocks of the above method. In addition, the processing component 302 may include one or more modules for the convenience of interaction between the processing component 302 and other components. For example, the processing component 302 may include a multimedia module for the convenience of interaction between the multimedia component 308 and the processing component 302.

The memory 304 is configured to store all types of data to support the operation of the apparatus 300. Examples of the data include the instructions of any applications or methods operated on the apparatus 300, contact data, phone book data, messages, pictures, videos, etc. The memory 304 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 306 may provide power for all components of the apparatus 300. The power supply component 306 may include a power supply management system, one or more power supplies, and other units related to generating, managing and distributing power for the apparatus 300.

The multimedia component 308 includes an output interface screen provided between the apparatus 300 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 308 includes a front camera and/or a rear camera. When the apparatus 300 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 310 is configured to output and/or input an audio signal. For example, the audio component 310 includes a microphone (MIC). When the apparatus 300 is in an operation mode, such as a call mode, a record mode, and a speech recognition mode, the microphone is configured to receive the external audio signal. The received audio signal may be further stored in the memory 304 or sent via the communication component 316. In some embodiments, the audio component 310 further includes a speaker configured to output an audio signal.

The I/O interface 312 provides an interface for the processing component 302 and the peripheral interface module, and the peripheral interface module may be a keyboard, a click wheel, a button, etc. The button may include but not limited to a home button, a volume button, a start button and a lock button.

The sensor component 314 includes one or more sensors, configured to provide various aspects of status assessment for the apparatus 300. For example, the sensor component 314 may detect the on/off state of the apparatus 300 and the relative positioning of the component. For example, the component is a display and a keypad of the apparatus 300. The sensor component 314 may further detect the location change of the apparatus 300 or one component of the apparatus 300, the presence or absence of contact between the user and the apparatus 300, the orientation or acceleration/deceleration of the apparatus 300, and the temperature change of the apparatus 300. The sensor component 314 may include a proximity sensor configured to detect the existence of the objects nearby without any physical contact. The sensor component 314 may further include a light sensor such as CMOS or CCD image sensor, which is configured to use in imaging applications. In some embodiments, the sensor component 314 may further include an acceleration transducer, a gyroscope sensor, a magnetic sensor, a pressure sensor or a temperature sensor.

The communication component 316 is configured for the convenience of wire or wireless communication between the apparatus 300 and other devices. The apparatus 300 may access wireless networks based on communication standard, such as WiFi, 2G or 3G, or their combination. In an embodiment, the communication component 316 receives broadcast signals or broadcast-related information from an external broadcast management system via a broadcast channel. In an embodiment, the communication component 316 further includes a near field communication (NFC) module to facilitate short-range communication. For example, the NFC module may be achieved based on an RFID technology, an IrDA technology, a UWB technology, a BT technology and other technologies.

In an embodiment, the apparatus 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes instructions, such as the memory 304 including instructions, the instructions may be executed by the processor 320 of the apparatus 300 to complete the above methods. For example, the non-transitory computer-readable storage medium may be a ROM, a random access memory (RAM), a CD-ROM, a magnetic tape, a floppy disk, an optical data storage device, etc.

Figure 11:
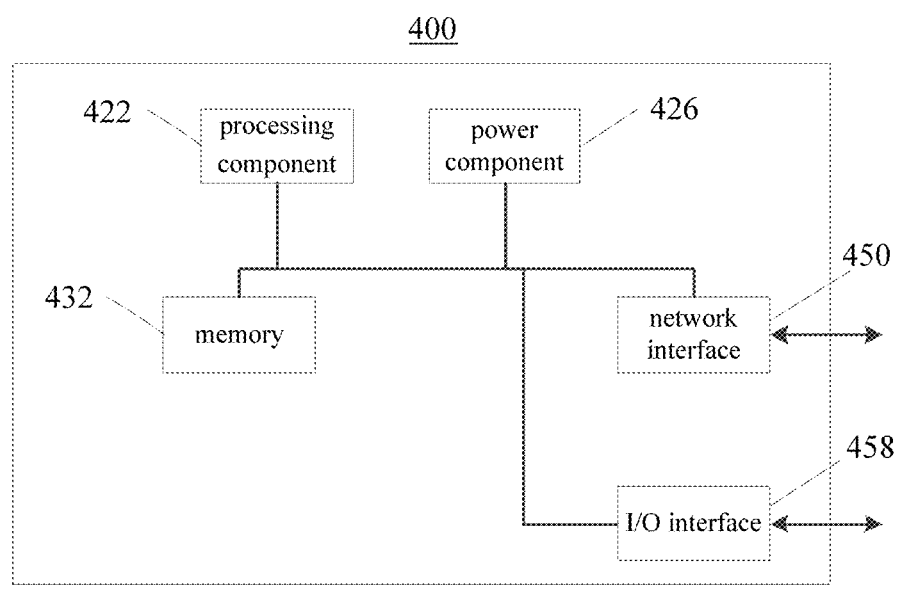
FIG. 11 is a block diagram illustrating a device according to an embodiment.

FIG. 11 is a block diagram illustrating an apparatus 400 configured to perform communication according to an embodiment. For example, the apparatus 400 may be provided as a network device. As illustrated in FIG. 11, the apparatus 400 includes a processing component 422, which further includes one or more processors, and a memory resource represented by a memory 432, for storing instructions executable by the processing component 422, such as an application program. The application program stored in the memory 432 may include one or more modules each corresponding to a set of instructions. In addition, the processing component 422 is configured to execute the instructions to perform the above methods.

The apparatus 400 may also include a power component 426 configured to perform power management of the apparatus 400, a wired or wireless network interface 450 configured to connect the apparatus 400 to a network, and an input output (I/O) interface 458. The apparatus 400 can operate based on an operating system stored in the memory 432, such as Windows Server™, Mac OS X™, Unix™, Linux™, FreeBSD™ or the like.

In an embodiment, there is provided a non-transitory computer-readable storage medium including instructions, such as the memory 432 including instructions, which may be executed by the processing component 422 of the apparatus 400 to complete the foregoing methods. For example, the non-transitory computer-readable storage medium may be ROM, random access memory (RAM), CD-ROM, magnetic tape, floppy disk, optical data storage device, etc.

It can be further understood that in the disclosure, the term "a plurality of" refers to two or more than two, and other quantifiers are similar. The term "and/or" describes an association relationship of associated objects, indicating that there can be three types of relationships. For example, A and/or B can indicate: A alone exists, A and B exist at the same time, and B exists alone. The character "/" generally indicates that the associated objects are in an "or" relationship. The singular forms "a", "said" and "the" are also intended to include plural forms, unless specified or limited otherwise.

It can be understood that, terms such as "first" and "second" are used herein for describing various information, these information should not be limited by these terms. These terms are only used for purposes of distinguishing the same kind of information, and are not intended to indicate or imply relative importance or significance. Actually, "first" and "second" may be used interchangeably. For example, first information may also be called a second information, and similarly, the second s information may also be called the first information, without departing from the scope of the present disclosure.

It can be understood that, although the operations are described in a specific order in the drawings of the embodiments of the disclosure, they should not be understood as requiring these operations to be performed in the specific order shown or in a serial order, or requiring all these operations to be performed to obtain the desired result. In certain circumstances, multitasking and parallel processing may be advantageous.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

The invention claimed is:

1. A communication method, performed by a terminal, comprising:
   reporting a capability parameter set, wherein the capability parameter set represents information on a capability supported by the terminal; and
   receiving first schedule information sent by a network device, wherein the first schedule information is determined based on the capability parameter set and a business requirement, the business requirement is sent to the network device by the terminal or there is the business requirement determined by the network device, wherein the first schedule information comprises second schedule information corresponding to a capability parameter subset, and the capability parameter subset comprises a capability parameter matching an actual application scenario in the capability parameter set, wherein the actual application scenario comprises a low speed rate and high delay scenario, wherein the capability parameter set comprises a bandwidth capability and an antenna capability supported by the terminal,
   wherein the capability parameter set further comprises at least one of the following:
   a capability related to a maximum transmitting power level, a duplex mode supporting capability, a capability related to a minimum processing delay, a carrier aggregation supporting capability, a dual connection supporting capability, a discontinuous reception capability, a mini-slot scheduling capability, a measurement conditional relaxation supporting capability, a full mobility supporting capability and a speech supporting capability.

2. The method of claim 1, wherein the capability parameter set further comprises at least one of:
   a coverage enhancement supporting capability, and a capability related to a maximum number of physical downlink control channel (PDCCH) blind detections.

3. The method of claim 1, wherein there is a business requirement determined based on the actual application scenario, and the business requirement comprises at least one of the following:
   a full mobility requirement, a power saving requirement, a coverage enhancement requirement, a speech supporting requirement, and a high rate requirement.

4. The method of claim 1, wherein the first schedule information comprises at least one of parameter configuration information and function enabling information.

5. A communication method, performed by a network device, comprising:
   determining a business requirement, wherein the business requirement is sent by the terminal or there is the business requirement determined by the network device;
   obtaining a capability parameter set, wherein the capability parameter set represents information on a capability supported by a terminal; and
   determining and sending first schedule information based on the capability parameter set and the business requirement, wherein the first schedule information comprises second schedule information corresponding to a capability parameter subset, and the capability parameter subset comprises a capability parameter matching an actual application scenario in the capability parameter set, wherein the actual application scenario comprises a low speed rate and high delay scenario,
   wherein the capability parameter set comprises a bandwidth capability and an antenna capability supported by the terminal,
   wherein the capability parameter set further comprises at least one of the following: a capability related to a maximum transmitting power level, a duplex mode supporting capability, a capability related to a minimum processing delay, a carrier aggregation supporting capability, a dual connection supporting capability, a discontinuous reception capability, a mini-slot scheduling capability, a measurement conditional relaxation supporting capability, a full mobility supporting capability and a speech supporting capability.

6. The method of claim 5, wherein the first schedule information comprises at least one of parameter configuration information and function enabling information.

7. A network device, comprising:
   a processor;
   a memory storing instructions executable by the processor;
   wherein, the processor is configured to perform the communication method of claim 5.

8. The method of claim 5, wherein the capability parameter set further comprises at least one of:
   a coverage enhancement supporting capability, and a capability related to a maximum number of physical downlink control channel (PDCCH) blind detections.

9. The method of claim 5, wherein there is a business requirement determined based on the actual application scenario, and the business requirement comprises at least one of the following: a full mobility requirement, a power saving requirement, a coverage enhancement requirement, a speech supporting requirement, and a high rate requirement.

10. A communication device, comprising:

a processor;

a memory storing instructions executable by the processor;

wherein, the processor is configured to perform a communication method, comprising:

reporting a capability parameter set, wherein the capability parameter set represents information on a capability supported by a terminal; and receiving first schedule information sent by a network device, wherein the first schedule information is determined based on the capability parameter set and a business requirement, the business requirement is sent to the network device by the terminal or there is the business requirement determined by the network device, wherein the first schedule information comprises second schedule information corresponding to a capability parameter subset, and the capability parameter subset comprises a capability parameter matching an actual application scenario in the capability parameter set, wherein the actual application scenario comprises a low speed rate and high delay scenario, wherein the capability parameter set comprises a bandwidth capability and an antenna capability supported by the terminal, wherein the capability parameter set further comprises at least one of the following:

a capability related to a maximum transmitting power level, a duplex mode supporting capability, a capability related to a minimum processing delay, a carrier aggregation supporting capability, a dual connection supporting capability, a discontinuous reception capability, a mini-slot scheduling capability, a measurement conditional relaxation supporting capability, a full mobility supporting capability and a speech supporting capability.

11. The device of claim 10, wherein the capability parameter set further comprises at least one of:

a coverage enhancement supporting capability, and a capability related to a maximum number of physical downlink control channel (PDCCH) blind detections.

12. The device of claim 10, wherein there is a business requirement determined based on the actual application scenario, and the business requirement comprises at least one of the following:

a full mobility requirement, a power saving requirement, a coverage enhancement requirement, a speech supporting requirement, and a high rate requirement.

13. The device of claim 10, wherein the first schedule information comprises at least one of parameter configuration information and function enabling information.

* * * * *